United States Patent [19]
Sakaguchi et al.

[11] Patent Number: 5,958,811
[45] Date of Patent: Sep. 28, 1999

[54] ULTRAVIOLET AND INFRARED RADIATION ABSORBING GLASS

[75] Inventors: Koichi Sakaguchi; Yukihito Nagashima; Shigeki Nakagaki, all of Osaka, Japan

[73] Assignee: Nippon Sheet Glass Co., Ltd., Osaka, Japan

[21] Appl. No.: 08/941,230

[22] Filed: Sep. 30, 1997

[30] Foreign Application Priority Data

Oct. 1, 1996 [JP] Japan .................................. 8-260913

[51] Int. Cl.$^6$ .............................. C03C 3/087; C03C 4/08
[52] U.S. Cl. .............................. 501/71; 501/64; 501/904; 501/905
[58] Field of Search ................... 501/64, 70, 71, 501/904, 905

[56] References Cited

U.S. PATENT DOCUMENTS

| 4,521,524 | 6/1985 | Yamashita ................................. 501/64 |
| 5,318,931 | 6/1994 | Nakaguchi et al. . |
| 5,688,727 | 11/1997 | Shelestak et al. ........................ 501/71 |

FOREIGN PATENT DOCUMENTS

| 0561337 | 9/1993 | European Pat. Off. . |
| 0565882 | 10/1993 | European Pat. Off. . |
| 4313215 | 10/1993 | Germany . |

OTHER PUBLICATIONS

Database WPI—Section Ch, Week 9248 Derwent Publications Ltd., London, GB; Class L01, AN 92–397080 XP002051343 & SU 1 706 979 A (Chenyatinsk Glas WKS), Jan. 23, 1992 (Abstract).

Database WPI—Section Ch, Week 9002 Derwent Publications Ltd., London, GB; Class L01, AN 90–014293 XP002051344 & SU 1 470 679 A (Gusev Glass Res Inst), Apr. 7, 1989 (Abstract).

*Primary Examiner*—Michael Marcheschi
*Attorney, Agent, or Firm*—Sughrue, Mion, Zinn, Macpeak & Seas, PLLC

[57] ABSTRACT

An ultraviolet and infrared radiation absorbing glass having excellent ultraviolet radiation absorbing power and a bronze or neutral gray tint which is suitably used as a window glass for vehicles of automobiles and also as a window glass for construction materials is provided. The glass comprises, in % by weight: basic glass components comprising 65 to 80% $SiO_2$, 0 to 5% $B_2O_3$, 0 to 5% $Al_2O_3$, 0 to 10% MgO, 5 to 15% CaO, 10 to 18% $Na_2O$, 0 to 5% $K_2O$, 5 to 15% MgO+CaO, and 10 to 20% $Na_2O+K_2O$, and coloring components comprising 0.20 to 0.50% total iron oxide (T-$Fe_2O_3$) in terms of $Fe_2O_3$, 0 to 3.0% $CeO_2$, 0.025 to 6.0% $La_2O_3$, 0 to 2.0% $TiO_2$, 0.0002 to 0.005% CoO, 0.0002 to 0.005% Se, 0 to 0.01% NiO, and 0 to 1.0% $SnO_2$, wherein 5 to 25% of said T-$Fe_2O_3$ in terms of $Fe_2O_3$ is FeO.

11 Claims, No Drawings

ULTRAVIOLET AND INFRARED RADIATION ABSORBING GLASS

FIELD OF THE INVENTION

The present invention relates to an ultraviolet and infrared radiation absorbing glass having a bronze or neutral gray tint.

BACKGROUND OF THE INVENTION

In order to meet the demand for the protection of interior trim of automobiles against deterioration, which has been increasing with the recent trend to luxury of the interior trim, and to reduce the load of air conditioning, a glass having ultraviolet and infrared radiation absorbing power has recently been proposed as window glass of automobiles.

For example, a green tinted glass containing a relatively large amount of $Fe_2O_3$ and having enhanced heat radiation absorbing power and ultraviolet radiation absorbing power has been developed as a window glass of automobiles. In the bronze or brown tinted glass, ultraviolet radiation absorbing power is enhanced by using $CeO_2$ and $TiO_2$ at a $Fe_2O_3$ content lower than that of the green tinted glass. For example, a heat radiation absorbing glass having a bronze tint disclosed in JP-A-6-40741 (the term "JP-A" as used herein means an "unexamined published Japanese patent application") comprises, in % by weight, as basic glass components, 68 to 74% $SiO_2$, 0.1 to 3.0% $Al_2O_3$, 2 to 4.5% MgO, 8 to 11% CaO, 11.5 to 16% $Na_2O$, and 0.5 to 3.0% $K_2O$, 0.1 to 0.4% $SO_3$, 68 to 74% $SiO_2+Al_2O_3$, 11 to 15% CaO+MgO, and 12 to 17% $Na_2O+K_2O$, and as coloring components, 0.13 to 0.55% of the total iron oxide in terms of $Fe_2O_3$, 0.2 to 0.6% $CeO_2$ and 0.15 to 0.45% $TiO_2$, and further comprises, in ppm, 0.3 to 14 CoO and 5 to 20 Se. This glass has the reduction rate ($Fe^{2+}/Fe^{3+}$) of 17 to 55%.

Further, a colored ultraviolet radiation absorbing glass disclosed in JP-A-6-345482 is a glass having a brown tint comprising, in % by weight, 65 to 75% $SiO_2$, 0.1 to 5% $Al_2O_3$, 1 to 6% MgO, 5 to 15% CaO, 10 to 18% $Na_2O$, 0 to 5% $K_2O$, 0.05 to 1.0% $SO_3$, 0.2 to 1.5% $CeO_2$, 0 to 1.0% $TiO_2$, 0 to 0.0015% CoO, 0.0002 to 0.0012% Se, and 0.2 to 0.4% $Fe_2O_3$, wherein 3 to 15% of the total iron oxide in terms of $FeO_2O_3$ is FeO.

The above-described conventional ultraviolet and infrared radiation absorbing glasses have an ultraviolet radiation absorbing power imparted by ultraviolet radiation absorption due to $Fe_2O_3$, $CeO_2$ and $TiO_2$ and interactions among them. However, in the glass having a bronze or neutral gray tint using the coloration of Se, the $Fe_2O_3$ content must be suppressed to a relatively small level in order to maintain the pink coloration of Se. Accordingly, it has been impossible to achieve both a bronze or neutral gray tint and high ultraviolet radiation absorbing power. That is, when the $TiO_2$ content is increased, the glass tends to be yellowish, while even if the $CeO_2$ content is increased, Se sometimes cannot be fully colored depending on the oxidation and reduction state of the glass so that the ultraviolet radiation absorbing power is not effectively increased.

SUMMARY OF THE INVENTION

The present invention has been made in the light of the above-described problems associated with the conventional techniques.

Accordingly, an object of the invention is to provide a bronze or neutral gray-tinted ultraviolet and infrared radiation absorbing glass particularly having a high ultraviolet radiation absorbing power.

The ultraviolet and infrared radiation absorbing glass according to the present invention comprises, in % by weight:

basic glass components comprising
  65 to 80% $SiO_2$,
  0 to 5% $B_2O_3$,
  0 to 5% $Al_2O_3$,
  0 to 10% MgO,
  5 to 15% CaO,
  10 to 18% $Na_2O$,
  0 to 5% $K_2O$,
  5 to 15% MgO+CaO, and
  10 to 20% $Na_2O+K_2O$, and coloring components comprising
  0.20 to 0.50% total iron oxide (T-$Fe_2O_3$) in terms of $Fe_2O_3$,
  0 to 3.0% $CeO_2$,
  0.025 to 6.0% $La_2O_3$,
  0 to 2.0% $TiO_2$,
  0.0002 to 0.005% CoO,
  0.0002 to 0.005% Se,
  0 to 0.01% NiO, and
  0 to 1.0% $SnO_2$ wherein 5 to 25% of the T-$Fe_2O_3$ in terms of $Fe_2O_3$ is FeO.

It is preferred in the ultraviolet and infrared radiation absorbing glass according to the present invention that the $CeO_2$ content in the coloring components is 0.5 to 2.0%.

It is further preferred in the ultraviolet and infrared radiation absorbing glass according to the present invention that the $CeO_2$ content in the coloring components is 1.4 to 2.0% and the $TiO_2$ content in the coloring components is 0 to 1.5%.

It is still; preferred that the $CeO_2$ content in the coloring components is 1.55 to 2.0% and the $TiO_2$ content is 0 to 1.0%.

It is still further preferred that the $La_2O_3$ content in the coloring components is 0.05 to 1.5%.

The ultraviolet and infrared radiation absorbing glass according to the present invention preferably has optical characteristics that visible light transmission as measured with the CIE standard illuminant A is 70% or more and a total solar energy transmission as measured in a wavelength region of 300 to 2,100 nm is less than 72%, when the glass has a thickness of 3.25 to 6.25 mm.

Further, the ultraviolet and infrared radiation absorbing glass according to the present invention preferably has optical characteristics that a dominant wavelength as measured with the CIE standard illuminant C is 572 to 580 nm, and a total ultraviolet transmission defined in ISO 9050 as measured in a wavelength region of 297.5 to 377.5 nm is less than 12%, when the glass has a thickness of 3.25 to 6.25 mm.

DETAILED DESCRIPTION OF THE INVENTION

The reasons for limitations of the glass composition of the ultraviolet and infrared radiation absorbing glass according to the present invention are explained below. Hereinafter, all percents are by weight.

$SiO_2$ is a main component forming a skeleton of glass. If the $SiO_2$ content is less than 65%, the glass has poor durability, and if it exceeds 80%, it is difficult to melt the composition.

While $B_2O_3$ is a component generally used for improvement of the durability of the glass or as a melting aid, it also functions to enhance ultraviolet absorption. If the $B_2O_3$ exceeds 5.0%, exertion of the ultraviolet transmission decreasing effect is extended to the visible region, so that not only does the tint tend to be yellowish, but also disadvantages occur in forming a glass due to volatilization of $B_2O_3$ and the like. Accordingly, the upper limit of the $B_2O_3$ content should be 5.0%.

$Al_2O_3$ serves to improve the durability of the glass. If the $Al_2O_3$ content exceeds 5%, it is difficult to melt the composition.

A preferred $Al_2O_3$ content is from 0.1 to 2%.

MgO and CaO both serve to improve the durability of the glass and also to control the liquidus temperature and a viscosity of a glass composition when forming a glass. If the MgO content exceeds 10%, the liquidus temperature rises. If the CaO content is less than 5% or higher than 15%, the liquidus temperature rises. If the total content of MgO and CaO is less than 5%, the durability of the resulting glass deteriorates. If the total content exceeds 15%, the liquidus temperature rises.

$Na_2O$ and $K_2O$ are used as glass melting accelerators. If the $Na_2O$ content is less than 10%, or if the total content of $Na_2O$ and $K_2O$ is less than 10%, the effect of melting acceleration is poor. If the $Na_2O$ content exceed 18%, or if the total content of $Na_2O$ and $K_2O$ exceeds 20%, the durability of the glass is decreased. $K_2O$ increases the pink coloration of Se and, at the same time, enhances the ultraviolet radiation absorbing power. It is not preferable that the $K_2O$ exceeds 5%, because it is more expensive than $Na_2O$.

Iron oxide is present in the glass in the form of $Fe_2O_3$ ($Fe^{3+}$) and FeO ($Fe^{2+}$). FeO is a component which serves to enhance infrared radiation absorbing power, and $Fe_2O_3$ is a component which serves to enhance ultraviolet radiation absorbing power together with $CeO_2$ and $TiO_2$.

If the amount of the total iron oxide (T-$Fe_2O_3$) is too small, the infrared radiation absorbing power and ultraviolet radiation absorbing power are low. If the amount thereof is too large, the visible light transmission is decreased. Therefore, the preferable amount of the total ion oxide is 0.20 to 0.50%.

If the amount of FeO is too small, the infrared radiation absorbing power is decreased, and if it is too large, the visible light transmission is decreased. Therefore, the preferable amount of Feo is 5 to 25% of T-$Fe_2O_3$ in terms of $Fe_2O_3$.

$CeO_2$ is a component which serves to enhance ultraviolet radiation absorbing power, and is present in the glass in the form of $Ce^{3+}$ or $Ce^{4+}$. In particular, $Ce^{3+}$ is effective in ultraviolet absorption because absorption in the visible light region is small. If the $CeO_2$ content is too large, the absorption in the short wavelength side of the visible light region is too large, and the glass becomes yellowish. Therefore, the $CeO_2$ content is 3.0% or less. In order to obtain a further desirable ultraviolet radiation absorbing power, the $CeO_2$ is preferably used in an amount of 0.5 to 2.0%, more preferably 1.4 to 2.0%, and most preferably 1.55 to 2.0%.

$La_2O_3$ is effective not only in decreasing the viscosity of the glass in melting but also in accelerating the melting of the glass, and it also improves the chemical durability of the glass, such as water resistance. It has been found that the ultraviolet transmission is decreased when $La_2O_3$ is added to the glass containing $Fe_2O_3$ and $CeO_2$. Where the glass containing $Fe_2O_3$ and $CeO_2$ is tempered, there are the effects that the ultraviolet transmission and solar energy transmission are decreased. It has also been found that the above effects can be enhanced by the addition of $La_2O_3$. Although the detailed mechanism of those effects has not been clarified, it can be considered that where $La^{3+}$ is introduced into the glass, it distorts the structure around ions such as $Ce^{3+}$, $Fe^{3+}$ and $Fe^{2+}$, because of the large ion radius of $La^{3+}$, so that each ion absorption is increased. If the $La_2O_3$ content is less than 0.025%, such an effect is insufficient, and if it exceeds 6.0%, the specific gravity of the glass becomes too high so that problems may arise such that the molten glass is difficult to be replaced with other glasses at the time of the production. The $La_2O_3$ content is preferably 0.05 to 1.5%. $La_2O_3$ may be added in the form of a raw material containing a high concentration of $La_2O_3$. However, it is required for such a raw material to be refined, resulting in increasing the raw material cost. Therefore, it is preferable for the purpose of decreasing the cost of the raw material that $La_2O_3$ is added in the form of a mixture with $CeO_2$ which is produced together with $La_2O_3$, without separating $La_2O_3$ from $CeO_2$ or in the form of an impurity remaining in $CeO_2$ having a low degree of purification.

$TiO_2$ is a component for enhancing the ultraviolet radiation absorbing power particularly by the interaction with FeO. If the $TiO_2$ content is too large, the glass tends to be yellow-tinted. Therefore, the $TiO_2$ content is 2.0% or less, preferably 0 to 1.5%, and more preferably 0 to 1.0%.

CoO is a component for forming a bronze or neutral gray tint by the coexistence with Se. If the CoO content is less than 0.0002%, a desired tint cannot be obtained, and if its content exceeds 0.005%, the visible light transmission is decreased.

Se is a component for obtaining a bronze or neutral gray tint due to pink coloration in combination with the complementary color of CoO. If the Se content is less than 0.0002%, a desired tint cannot be obtained, and if it exceeds 0.005%, the visible light transmission is decreased.

NiO is a component for obtaining a neutral gray tint. If the NiO content is too large, the visible light transmission is decreased. Therefore, it should be used in an amount of 0.01% or less.

$SnO_2$ converts to $Sn^{2+}$ at high temperature side, and to $Sn^{4+}$ at low temperature side. Therefore, due to this change in the valency, $SnO_2$ functions as a reducing and fining agent in melting the glass. Further, in the glass containing Se and having a bronze or neutral gray tint, $SnO_2$ has effects of accelerating pink coloration of Se and also decreasing the ultraviolet transmission. If the $SnO_2$ content exceeds 1.0%, an undissolved matter tends to be formed. Therefore, the $SnO_2$ content is preferably 0.6% or less.

The glass having the above-described composition of the present invention may further contain at least one of ZnO, MnO, $V_2O_5$ or $MoO_3$ in the total amount of 0 to 1%, and 0 to 1% of S in terms of $SO_3$ so long as the object of the present invention is not impaired.

The present invention will now be described in more detail by reference to the following Examples. It should however be understood that the invention is not construed as being limited thereto. Unless otherwise indicated, all parts, percents, ratios, and the like are by weight.

EXAMPLES 1 TO 13

In order to obtain a given glass composition, silica sand, dolomite, limestone, soda ash, potassium carbonate, boron oxide, salt cake, ferric oxide, titanium oxide, cerium oxide, cobalt oxide, sodium selenite, nickel oxide, stannous oxide, lanthanum oxide and a carbonaceous material as a reducing agent were appropriately mixed. In Example 11, a mixture containing $CeO_2$ and $La_2O_3$ at a weight ratio of about 5:3 was used as a raw material of $CeO_2$ and $La_2O_3$. In Example 12, this mixture was added until the $CeO_2$ content reaches a given amount and a deficient amount of $La_2O_3$ was added in the form of lanthanum oxide. In Example 13, $La_2O_3$ was added in a given amount by using cerium oxide containing about 5% of $La_2O_3$ as a raw material of cerium oxide.

These raw materials were melted at 1,500° C. for 4 hours in an electric furnace. The molten glass was cast on a stainless steel plate and annealed to obtain a glass plate having a thickness of about 7 mm. This glass plate was polished so as to have a thickness of either 3.5, 4, or 5 mm.

The optical characteristics of the sample thus obtained were measured. That is, a visible light transmission (YA) measured with the CIE standard illuminant A, a total solar energy transmission (TG), an ultraviolet radiation transmission (Tuv) defined in ISO 9050, and a dominant wavelength (Dw) and an excitation purity (Pe) measured with the CIE standard illuminant C were obtained.

The results obtained in the Examples are shown in Table 1 below. Table 1 shows a concentration of each component in the samples obtained and optical characteristic values of those samples. In Table 1, concentrations are all % by weight, provided that the ratio of FeO (in terms of $Fe_2O_3$) to T-$Fe_2O_3$ (FeO/T-$Fe_2O_3$) is shown not by the percentage, but by an arithmetical ratio.

TABLE 1

|  | Example 1 | Example 2 | Example 3 | Example 4 | Example 5 |
|---|---|---|---|---|---|
| $SiO_2$ | 70.5 | 70.4 | 70.5 | 67.4 | 70.6 |
| $B_2O_2$ | 1.0 | — | — | — | — |
| $Al_2O_3$ | 1.40 | 1.40 | 1.60 | 1.34 | 1.40 |
| MgO | 3.80 | 3.80 | 3.80 | 3.14 | 3.29 |
| CaO | 8.00 | 7.90 | 7.70 | 7.94 | 8.32 |
| $Na_2O$ | 13.00 | 13.00 | 12.70 | 12.65 | 13.25 |
| $K_2O$ | 0.70 | 0.70 | 0.68 | 0.96 | 1.00 |
| T—$Fe_2O_3$ | 0.41 | 0.35 | 0.25 | 0.45 | 0.45 |
| FeO | 0.076 | 0.044 | 0.040 | 0.048 | 0.052 |
| FeO/T—$Fe_2O_3$ | 0.205 | 0.140 | 0.178 | 0.117 | 0.129 |
| $CeO_2$ | 0.48 | 0.91 | 1.10 | 1.01 | 1.00 |
| $La_2O_3$ | 0.29 | 0.55 | 0.66 | 5.05 | 0.60 |
| $TiO_2$ | 0.39 | 0.96 | 1.00 | 0.10 | 0.10 |
| CoO | 0.0005 | 0.0030 | 0.0035 | 0.0020 | 0.0020 |
| Se | 0.0008 | 0.0009 | 0.0007 | 0.0011 | 0.0011 |
| NiO | — | — | — | — | — |
| $SnO_2$ | — | — | — | — | — |
| Thickness (mm) | 4 | 4 | 3.5 | 3.5 | 3.5 |
| YA (%) | 71.4 | 70.4 | 71.6 | 73.8 | 72.6 |
| TG (%) | 62.1 | 69.9 | 71.2 | 70.2 | 68.5 |
| Tuv (ISO) (%) | 9.7 | 7.9 | 10.4 | 9.5 | 11.5 |
| Dw (nm) | 578 | 576 | 577 | 577 | 578 |
| Pe (%) | 10.9 | 7.9 | 5.9 | 6.8 | 7.0 |

|  | Example 6 | Example 7 | Example 8 | Example 9 | Example 10 |
|---|---|---|---|---|---|
| $SiO_2$ | 70.3 | 70.6 | 70.1 | 69.8 | 69.6 |
| $B_2O_2$ | — | — | — | — | — |
| $Al_2O_3$ | 1.40 | 1.50 | 1.39 | 1.39 | 1.39 |
| MgO | 3.80 | 3.80 | 3.27 | 3.25 | 3.24 |
| CaO | 7.90 | 7.70 | 8.27 | 8.23 | 8.21 |
| $Na_2O$ | 13.00 | 12.70 | 13.17 | 13.10 | 13.11 |
| $K_2O$ | 0.70 | 0.68 | 0.99 | 0.99 | 1.00 |
| T—$Fe_2O_3$ | 0.30 | 0.23 | 0.45 | 0.45 | 0.45 |
| FeO | 0.046 | 0.037 | 0.051 | 0.047 | 0.046 |
| FeO/T—$Fe_2O3$ | 0.170 | 0.179 | 0.126 | 0.117 | 0.113 |
| $CeO_2$ | 1.50 | 1.00 | 1.40 | 1.70 | 1.70 |
| $La_2O_3$ | 0.90 | 0.60 | 0.80 | 1.00 | 1.00 |
| $TiO_2$ | 0.23 | 1.20 | 0.10 | 0.10 | 0.10 |
| CoO | 0.0015 | 0.0038 | 0.0020 | 0.0020 | 0.0020 |
| Se | 0.0016 | 0.0005 | 0.0011 | 0.0011 | 0.0011 |
| NiO | — | 0.0010 | — | — | — |
| $SnO_2$ | — | — | — | — | 0.32 |
| Thickness (mm) | 4 | 3.5 | 3.5 | 3.5 | 3.5 |
| YA (%) | 73.8 | 71.8 | 72.6 | 73.7 | 72.7 |
| TG (%) | 69.8 | 71.9 | 68.8 | 70.0 | 69.8 |
| Tuv (ISO) (%) | 9.3 | 11.4 | 10.1 | 8.8 | 8.4 |
| Dw (nm) | 578 | 572 | 577 | 577 | 578 |
| Pe (%) | 6.6 | 4.0 | 6.6 | 6.8 | 7.5 |

|  | Example 11 | Example 12 | Example 13 |
|---|---|---|---|
| $SiO_2$ | 69.7 | 68.6 | 70.8 |
| $B_2O2$ | — | — | — |
| $Al_2O_3$ | 1.39 | 1.36 | 1.45 |
| MgO | 3.27 | 3.32 | 3.80 |
| CaO | 8.21 | 8.09 | 7.80 |
| $Na_2O$ | 13.12 | 12.87 | 13.00 |
| $K_2O$ | 0.99 | 0.97 | 0.73 |
| T—$Fe_2O_3$ | 0.35 | 0.35 | 0.35 |
| FeO | 0.040 | 0.042 | 0.055 |
| FeO/T—$Fe_2O_3$ | 0.128 | 0.134 | 0.174 |
| $CeO_2$ | 1.60 | 1.60 | 1.75 |
| $La_2O_3$ | 0.96 | 2.80 | 0.09 |
| $TiO_2$ | 0.05 | 0.05 | 0.23 |
| CoO | 0.0010 | 0.0010 | 0.0011 |
| Se | 0.0009 | 0.0007 | 0.0012 |
| NiO | — | — | — |
| $SnO_2$ | 0.32 | — | — |
| Thickness (nm) | 5 | 5 | 4 |
| YA (%) | 71.1 | 73.1 | 72.9 |
| TG (%) | 66.4 | 66.9 | 66.6 |
| Tuv (ISO) (%) | 6.4 | 6.8 | 8.9 |
| Dw (nm) | 578 | 577 | 578 |
| Pe (%) | 9.8 | 7.9 | 7.3 |

As is apparent from the results shown in Table 1 above, the samples according to the Examples are the bronze or neutral gray tinted glass with a thickness of 3.25 to 6.25 mm has optical characteristics that a visible light transmission (YA) as measured with the CIE standard illuminant A is 70% or more, a dominant wavelength (Dw) as measured with the CIE standard illuminant C is 572 to 580 nm, a total solar energy transmission (TG) is less than 72%, and an ultraviolet transmission (Tuv) defined in ISO 9050 is less than 12%.

COMPARATIVE EXAMPLES 1 TO 3

Comparative Examples to the present invention are shown in Table 2. Those comparative glasses do not contain $La_2O_3$ which is an essential component of the present invention, and is therefore not within the scope of the present invention. Comparative Examples 1 to 3 are the glass corresponding to thse of Examples 4, 9 and 11, respectively, which each do not contain $La_2O_3$.

TABLE 2

|  | Comparative Example 1 | Comparative Example 2 | Comparative Example 3 |
|---|---|---|---|
| $SiO_2$ | 71.0 | 70.5 | 70.4 |
| $B_2O_2$ | — | — | — |
| $Al_2O_3$ | 1.41 | 1.40 | 1.40 |
| MgO | 3.31 | 3.28 | 3.40 |
| CaO | 8.36 | 8.32 | 8.29 |
| $Na_2O$ | 13.32 | 13.24 | 13.25 |

TABLE 2-continued

|  | Comparative Example 1 | Comparative Example 2 | Comparative Example 3 |
|---|---|---|---|
| $K_2O$ | 1.01 | 1.00 | 1.00 |
| $T-Fe_2O_3$ | 0.47 | 0.45 | 0.35 |
| FeO | 0.048 | 0.047 | 0.040 |
| $FeO/T-Fe_2O_3$ | 0.113 | 0.117 | 0.128 |
| $CeO_2$ | 1.01 | 1.70 | 1.60 |
| $La_2O_3$ | — | — | — |
| $TiO_2$ | 0.10 | 0.10 | 0.05 |
| Se | 0.0020 | 0.0020 | 0.0010 |
| CoO | 0.0011 | 0.0011 | 0.0009 |
| NiO | — | — | — |
| $SnO_2$ | — | — | 0.32 |
| Thickness (nm) | 3.5 | 3.5 | 5 |
| YA (%) | 73.9 | 73.7 | 71.1 |
| TG (%) | 70.1 | 70.0 | 66.4 |
| Tuv (%) | 12.1 | 9.5 | 7.2 |
| Dw (nm) | 578 | 577 | 578 |
| Pe (%) | 6.9 | 6.8 | 9.8 |

As being apparent from Tables 1 to 2, the glasses obtained in the Examples have a decreased ultraviolet transmission as compared with that of the glasses obtained in the Comparative Examples. Thus, it can be seen that the ultraviolet and infrared radiation absorbing glass having bronze or neutral gray tint could be obtained in the Examples.

In order to examine chemical durability of the glasses of Examples 4 and 9 and Comparative Examples 1 and 2, each of the glasses was placed in a constant temperature and humidity bath maintained under the condition of saturated atmosphere at 80° C. for 200 hours. The glass was taken out of the bath and cooled. The reflectance of the cooled glass was determined. The difference of the reflectance before or after introducing into the bath was determined. According to this method, the reflectance is decreased when the glass surface is modified. Therefore, the modification of the glass can be conveniently evaluated based on the degree of decrease in the reflectance. The reflectance of each glass is shown in Table 3 below.

TABLE 3

|  | Change of reflectance (%) |
|---|---|
| Example 4 | −0.63 |
| Example 9 | −0.81 |
| Comparative Example 1 | −2.24 |
| Comparative Example 2 | −1.50 |

As is apparent from Table 3, the glass of the Examples has a decrease in reflectance smaller than that of the Comparative Examples so that the surface is difficult to be modified. Therefore, it can be seen that the glass of the Examples has a high chemical durability.

As described in detail above, the ultraviolet and infrared radiation absorbing glass according to the present invention makes it possible to produce a bronze or neutral gray tinted glass having excellent ultraviolet radiation absorbing power.

Further, in view of the facts that the ultraviolet and infrared radiation absorbing glass of the present invention has excellent ultraviolet radiation absorbing power and also has bronze or neutral gray tint, when the glass is used as a window glass for vehicles of automobiles and also as a window glass for construction materials, it is effective in protection of interior materials inside a room against deterioration and fading.

Furthermore, according to the ultraviolet and infrared radiation absorbing glass of the present invention, $CeO_2$ and $La_2O_3$ can be added as an inexpensive raw material having a low degree of purification. Therefore, an ultraviolet and infrared radiation absorbing glass having excellent ultraviolet radiation absorbing power and chemical durability can be produced at low cost.

While the invention has been described in detail and with reference to specific examles thereof, it will be apparent to one skilled in the art that various changes and modifications can be made therein without departing from the spirit and scope thereof.

What is claimed is:

1. An ultraviolet and infrared radiation absorbing glass consisting essentially of, in % by weight:
   basic glass components comprising
   65 to 80% $SiO_2$,
   0 to 5% $B_2O_3$,
   0 to 5% $Al_2O_3$,
   0 to 10% MgO,
   5 to 15% CaO,
   10 to 18% $Na_2O$,
   0 to 5% $K_2O$,
   5 to 15% MgO+CaO, and
   10 to 20% $Na_2O+K_2O$, and
   coloring components comprising
   0.20 to 0.50% total iron oxide ($T-Fe_2O_3$) in terms of $Fe_2O_3$,
   0 to 3.0% $CeO_2$,
   0.025 to 6.0% $La_2O_3$,
   0 to 2.0% $TiO_2$,
   0.0002 to 0.005% CoO,
   0.0002 to 0.005% Se,
   0 to 0.01% NiO, and
   0 to 1.0% $SnO_2$
   wherein 5 to 25% of said $T-Fe_2O_3$ in terms of $Fe_2O_3$ is FeO, said glass having a bronze or neutral grey tint, wherein said $La_2O_3$ improves the chemical durability of the glass and wherein said Se provides the bronze or neutral gray tint to said glass due to pink coloration in combination with the complementary color of CoO.

2. The ultraviolet and infrared radiation absorbing glass as claimed in claim 1, wherein the $CeO_2$ content in the coloring components is 0.5 to 2.0%.

3. The ultraviolet and infrared radiation absorbing glass as claimed in claim 1, wherein the $CeO_2$ content in the coloring components is 1.4 to 2.0%, and the $TiO_2$ content in the coloring components is 0 to 1.5%.

4. The ultraviolet and infrared radiation absorbing glass as claimed in claim 1, wherein the $CeO_2$ content in the coloring components is 1.55 to 2.0%, and the $TiO_2$ content in the coloring components is 0 to 1.0%.

5. The ultraviolet and infrared radiation absorbing glass as claimed in claim 1, wherein the $La_2O_3$ content in the coloring components is 0.05 to 1.5%.

6. The ultraviolet and infrared radiation absorbing glass as claimed in claim 1, wherein said glass has a visible light transmission of 70% or more as measured with the CIE standard illuminant A, when said glass has a thickness of 3.25 to 6.25 mm.

7. The ultraviolet and infrared radiation absorbing glass as claimed in claim 1, wherein said glass has a solar energy transmission of less than 72%, when said glass has a thickness of 3.25 to 6.25 mm.

8. The ultraviolet and infrared radiation absorbing glass as claimed in claim 1, wherein said glass has a dominant wavelength of 572 to 580 nm as measured with the CIE standard illuminant C, when said glass has a thickness of 3.25 to 6.25 mm.

9. The ultraviolet and infrared radiation absorbing glass as claimed in claim 1, wherein said glass has an ultraviolet transmission defined in ISO 9050 of less than 12%, when said glass has a thickness of 3.25 to 6.25 mm.

10. The ultraviolet and infrared radiation absorbing glass as claimed in claim 1, wherein the amount of $CeO_2$ is 0 to 0.91%.

11. The ultraviolet and infrared radiation absorbing glass as claimed in claim 1, wherein 5 to 20.5% of said $T\text{-}Fe_2O_3$ in terms of $Fe_2O_3$ is FeO.

* * * * *